United States Patent [19]
Hugunin

[11] Patent Number: 6,161,324
[45] Date of Patent: Dec. 19, 2000

[54] SCENT TAB FOR FISHING LURE

[76] Inventor: Jim Hugunin, 1113 Galway Rd., Joliet, Ill. 60431

[21] Appl. No.: 09/235,641

[22] Filed: Jan. 22, 1999

[51] Int. Cl.[7] .......................... A01K 85/01; A01K 83/06
[52] U.S. Cl. ...................... 43/42.06; 43/42.25; 43/42.29; 43/44.8
[58] Field of Search ................. 43/42.06, 44.99, 43/42.29, 44.2, 44.8, 42.25, 42.44

[56] References Cited

U.S. PATENT DOCUMENTS

| | | | |
|---|---|---|---|
| 2,703,945 | 3/1955 | Johnson | 43/42.06 |
| 3,605,316 | 9/1971 | Rogers . | |
| 3,953,934 | 5/1976 | Visser | 43/42.06 |
| 4,205,476 | 6/1980 | Hsu | 43/42.06 |
| 4,744,167 | 5/1988 | Steele | 43/42.06 |
| 4,794,720 | 1/1989 | Robertaccio | 43/42 |
| 5,113,606 | 5/1992 | Rinker | 43/42.19 |

*Primary Examiner*—Jack W. Lavinder
*Attorney, Agent, or Firm*—Patula & Associates

[57] ABSTRACT

A method and device is disclosed for scenting a bucktail type fishing lure in the area of the hair-like skirt of the bucktail, approximate the hook. The device includes a body of absorbent material that is suitably fastened or affixed to the lure. Fish scent is applied to the body, which retains the scent and prevents the scent from soaking and clumping the bristles of the bucktail skirt. The body could take various shapes and sizes, including for example a tab or disk shape, a cone or bullet shape, a rectangular strip-like shape, or one or more spherical shapes. The absorbent material is preferably wool or wool-like material, or an absorbent porous material. The body further assists the bristles of the bucktail skirt to assume a conical shape.

2 Claims, 1 Drawing Sheet

SCENT TAB FOR FISHING LURE

The present invention relates to fishing lures and particularly scents for fishing lures, specifically, to a scent tab for fishing lures and especially for bucktail type fishing lures.

BACKGROUND OF THE INVENTION

Fishing is an art or science. Fishermen and women are constantly taking a scientific approach to attempt to increase the chances or probability that a fish will strike their lures or baits. One way fishermen and women attempt to achieve this increase is by using fish scents. Fish scents are liquids or oils which produce an odor that attracts fish, or deceives fish into thinking the artificial fishing lure is actually live bait. Fishermen and women use scents by applying the liquid or oil on the surface of the lure. The lure is then casted into the water in an attempt to catch a fish. After several casts, the scent tend to wear or wash off in the water and the scent needs to be reapplied.

There are numerous limitations or disadvantages with the use of scents on fishing lures. Use of scents can be messy and can leak or drip off the lure and onto the hands or clothing of the person applying the scents. Further, the scents must be reapplied often, which takes away from fishing time, especially in cold whether where gloves need to be removed, or at night when it is hard to see.

Additionally, scents cannot be adequately used on certain types of lures, for example on bucktails. Bucktail lures are lures that typically include a body portion with a spinner at a front end and a treble hook at a back end. A hair-like skirt is affixed to the back end and substantially surrounds the treble hook. When in use, the spinner spins and the hair-like skirt assumes a conical form around the treble hook. However, when a scent is applied to the bucktail, the liquids or oils soak the hair-like strands of the skirt, matting them down and clinging them together, similar to a persons wet hair. When this occurs, the bucktail does not function as desired since the skirt merely drags through the water in a clump instead of fanning out into a cone shape. Thus, since a fish typically will not strike a bucktail with a matted down skirt, fishermen and women typically do not scent bucktails.

Accordingly, there is a need for a way to scent certain fishing lures, and particularly bucktails or any lures with hair-like strands or fibers. The present invention fulfills this need and overcomes the aforementioned limitations and disadvantages.

BRIEF SUMMARY OF THE INVENTION

The present invention is an attachment for a fishing lure in the form of a body of material having absorbent characteristics, or characterized by being capable of receiving and holding fish scents. The body of material is attached or suitably affixed to a fishing lure at a desired location by any suitable means. In a preferred embodiment, the body of material takes the form of a woolen tab-like member which is affixed at the back end of a bucktail lure, just above the treble hook, and being surrounded by the hair-like skirt. In this manner, the tab-like member receives a fish scent and prevents the fish scent from soaking the hair-like skirt. Thus, the scent tab of the present invention allows a bucktail to be scented without hindering performance of the bucktail. Additionally, the scent tab is preferably shaped to assist the bucktail skirt in assuming a conical form during use.

Accordingly, it is the principle object of the present invention to provide a method and device for scenting a fishing lure.

It is a further object of the present invention to provide a fishing lure attachment which is capable of receiving and holding fish scents.

It is another object of the present invention to provide a scent absorbent member for a fishing lure.

It is also an object of the invention to provide a method and device for scenting a bucktail type fishing lure in the area of the hair-like skirt, approximate the hook.

It is an additional object of the present invention to provide a scent tab for a fishing lure which does not hinder performance of the lure when scented.

It is yet another object of the present invention to provide a scent tab for a bucktail that assists the skirt of the bucktail to flair out and assume a conical form.

Numerous other advantages and features of the invention will become readily apparent from the detailed description of the preferred embodiment of the invention, from the claims and from the accompanying drawings in which like numerals are employed to designate like parts throughout the same.

BRIEF DESCRIPTION OF THE DRAWINGS

A fuller understanding of the foregoing may be had by reference to the accompanying drawings wherein.

DETAILED DESCRIPTION OF THE PREFERRED EMBODIMENT OF THE PRESENT INVENTION

Figure 1:
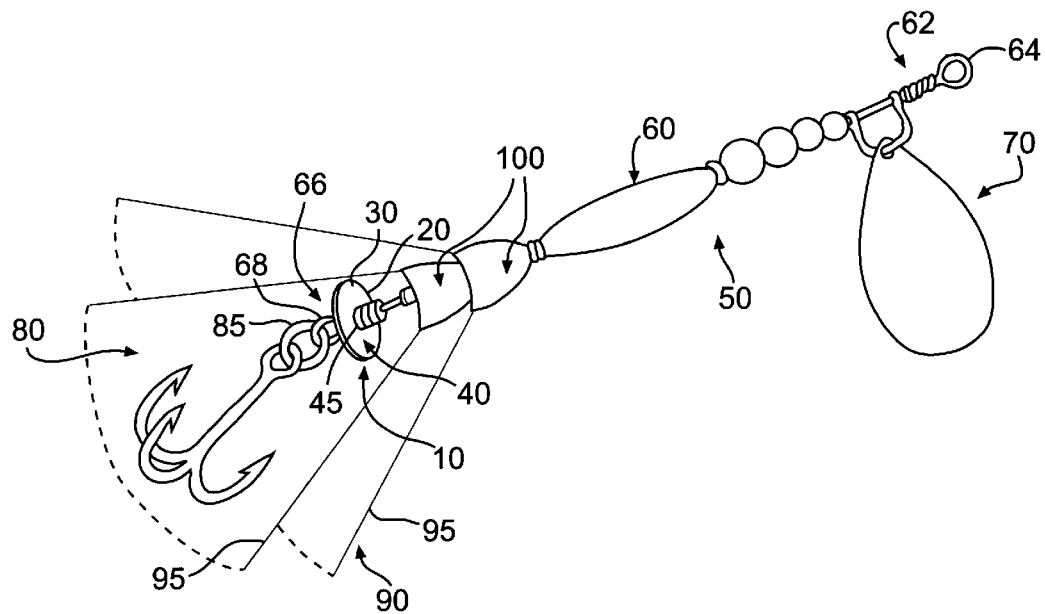
FIG. 1 is a perspective view of the present invention in use on a fishing lure.

While the invention is susceptible of embodiment in many different forms, there is shown in the drawings and will be described herein in detail a preferred embodiment of the present invention. It should be understood, however, that the present disclosure is to be considered an exemplification of the principles of the invention and is not intended to limit the spirit and scope of the invention and/or claims of the embodiment illustrated.

FIG. 1 illustrates a perspective view of the present invention 10 in use on a fishing lure 50, and specifically a bucktail type fishing lure. The present invention comprises generally a body 20 of absorbent material 30. Body 20 is illustrated in FIG. 1 in the shape of a tablet or disk. However, it should be understood that the body could take any suitable form, as discussed below in more detail. The body 20 includes a means 40 for fastening the body 20 to the fishing lure 50. As illustrated in FIG. 1, the means 40 for fastening takes the form of an aperture 45. However, it should be understood that the means 40 for fastening could take any suitable form, as discussed in more detail below.

Fishing lure 50 is comprised of a body portion 60 having a front end 62 terminating in an eyelet 64, and a back end 66 terminating in an eyelet 68. A spinner 70 is attached at the front end 62, and a treble hook 80 is attached via a split ring 85 at the back end 66. Towards the back end of the body portion 60, two co-centric hair-like skirts 90 are provided.

Other bucktail type fishing lures may have only one skirt. Skirts 90 are comprised of a plurality of soft, hair-like bristles 95 substantially encircling the lure end 66, body 20 and treble hook 80, and thus forming a conical shape. For ease of illustration, so that the present invention and treble hook can be seen, only the outline of the bristles are shown. The bristles 95 are held secured at one end and held to the lure 50 via collars 100.

The body 20 of FIG. 1 is secured to the lure 50 by means 40 for fastening as follows. Prior to formation of the eyelet 68, the back end 66 of the lure 50 is passed through aperture 45. Eyelet 68 is then formed and is sized to be larger than aperture 45. In this manner, body 20 is retained on the fishing lure 50 and prevented from slipping off or being removed by the eyelet 68 and the rest of the fishing lure. However, it should be understood that alternate means 40 for fastening could allow the body 20 to be selectively removable from the fishing lure, as described below.

As can be seen in FIG. 1, the shape of body 20 is such that it tends to hold the bristles 95 out away from the lure end 66 and treble hook 80. This aids the bristles 95 in assuming their conical shape during use of the lure.

Figure 2:
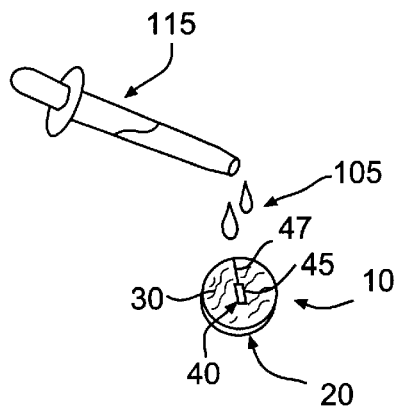
FIG. 2 is a perspective view of the present invention having a fish scent applied thereto.

Referring now to FIG. 2, the present invention 10 is shown in the absence of a lure. Body 20 is shown in the form of a tab or disk and is formed of an absorbent material 30. It should be understood that absorbent material 30 could be any suitable material such wool or a wool-like, fibrous material. In general, any fibrous material or porous material, such as a sponge-like material, could be used to form the body 20, so long as it is capable of receiving and holding a fish scent 105. Fish scent 105 is shown being applied to body 20 via an applicator 115. It is foreseen that fish scent 105 could be applied in any suitable manner.

Also shown in body 20 is means 40 for fastening, in the form of aperture 45. Additionally, a slot 47 can be provided in body 20 which would allow body 20 to be selectively positioned on and removed from fishing lure 50. Preferably, aperture 45 would have a very snug fit on back end 66, such that when slipped onto end 66 via slot 47, body 20 would stay in place and not slip or fall off during use. Alternately, it is foreseen that slot 47 could be selectively closed shut by any suitable means to prevent body 20 from accidently slipping off end 66. Also, body 20 could have other means for holding the body to the fishing lure, as discussed below.

In use, the present invention 10 is affixed to the lure 50 as shown and described with reference to FIGS. 1 and 2. Fish scent 105 is then applied to body 20 by applicator 115 or by any suitable means. It should be understood that the fish scent could be applied to body 20 before it is affixed to lure 50. Body 20 receives the fish scent via the absorbent material 30 and retains the scent therein, and prevents the fish scent from soaking the bristles 95 of the skirt 90. In this manner, a fish scent has successfully been applied to a bucktail fishing lure in the area of the skirt of the bucktail, in proximity to the hook, without hindering performance of the bucktail. Also, the scent not need to be applied nearly as often as prior to the invention, as the body will hold and retain the scent. Further, the shape of body 20 assists the bristles 95 to assume a conical shape.

Figure 3:
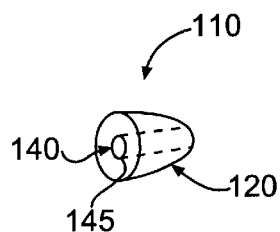
FIG. 3 is a perspective view of an alternate embodiment of the present invention.

Referring now to FIG. 3, an alternate embodiment 110 of the present invention is shown. Embodiment 110 discloses a body 120 having a cone or bullet shaped form. Body 120 is provided with means 140 for fastening the body to the fishing lure. As illustrated, means 140 comprises a bore 145. Body 120 would be placed on the lure in the same manner as that of body 20, i.e., during the manufacture of the lure, or selectively placed thereon in any suitable manner, for example via a slot (as shown in FIG. 2). As with body 20, the shape of body 120 would aid the bristles in assuming the desired conical shape.

Figure 4:
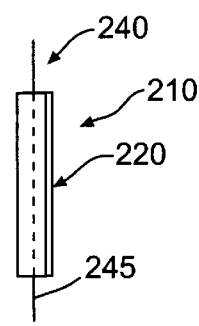
FIG. 4 is a perspective view of another alternate embodiment of the present invention.

FIG. 4 illustrates another alternate embodiment 210 of the present invention. Embodiment 210 discloses a body 220 having a rectangular, strip-like shape. Body 220 is provided with means 240 for fastening the body to the fishing lure. As illustrated, means 240 comprises a wire 245 running through and extending out from body 245. Body 220 is flexible and would be placed on the lure being wrapped around the back end 66 of the lure. The bent wire 245 would hold the body 220 to the lure. The extended ends of the wire could further be wrapped around end 66 in any suitable manner to secure body 220 to the lure.

Figure 5:
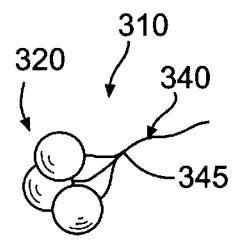
FIG. 5 is a perspective view of a further alternate embodiment of the present invention.

FIG. 5 illustrates another alternate embodiment 310 of the present invention. Embodiment 310 discloses a plurality of bodies 320 having spherical shapes. While three spherical bodies are illustrated, it should be understood that one or more bodies could be used. Bodies 320 include means 340 for fastening the bodies to the fishing lure. As illustrated, means 340 comprises a string or line 345, for example a fishing line, to which each of the spherical bodies are attached. The bodies 320 would be attached to the lure by tying the line 345 to the lure in the desired location.

It is to be understood that the embodiments herein described are merely illustrative of the principles of the present invention. Various modifications may be made by those skilled in the art without departing from the spirit or scope from the claims which follow. For example, the present invention could be used on any and all types of lures and can be suitably fastened thereto at any desired location through any desired means for fastening. Further, in lieu of absorbent material, the body could take the form of a scent permeable container.

What is claimed is:

1. A scented bucktail fishing lure comprising:
   a lure body portion having a front end terminating at an eyelet, and a back end terminating in an eyelet;
   a hook attached to said eyelet of said back end;
   at least one hair-like skirt attached to said lure body portion via a collar, said skirt extending over and encircling said back end and said hook;
   a scent body removably attached to said lure body portion at said back end and proximate said collar, said scent body adapted to selectively provide a scent to said bucktail lure without interfering with the motion of the lure and without affecting the hair-like skirt; and
   a means for fastening said scent body to said fishing lure, said means for fastening adapted to allow repeated, selected attachment and removal of said scent body to and from said lure body portion without the need to alter said lure;
   wherein said scent body is shaped as a rectangular strip, and said means for fastening includes a wire in said rectangular strip, said scent body being deformable such that said rectangular stip is adapted to attach to said lure body portion by being wrapped around said lure body portion.

2. A method of scenting a bucktail fishing lure having a lure body portion, a front end terminating at an eyelet, a back end terminating in an eyelet, a hook attached to said eyelet of said back end, and at least one hair-like skirt attached to said lure body portion via a collar, said skirt extending over and encircling said back end and said hook, said method comprising the steps of:

providing a deformable rectangular strip scent body on said lure body portion at said back end and proximate said collar;

adapting said scent body to selectively provide a scent to said bucktail lure without interfering with the motion of the lure and without affecting the hair-like skirt;

providing a means for fastening said scent body to said fishing lure, said means for fastening including a wire in said scent body;

adapting said means for fastening to allow repeated, selected attachment and removal of said scent body to and from said lure body portion without the need to alter said lure; and attaching said scent body to said lure body portion by wrapping said scent body around said lure body portion.

* * * * *